(12) United States Patent
Lorenz (10) Patent No.: US 11,214,357 B2
(45) Date of Patent: Jan. 4, 2022

(54) WING FOR AN AIRCRAFT (71) Applicant: Airbus Operations GmbH, Hamburg (DE)

(72) Inventor: Christian Lorenz, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 20 days.

(21) Appl. No.: 16/943,601

(22) Filed: Jul. 30, 2020

(65) Prior Publication Data

US 2021/0031902 A1  Feb. 4, 2021

(30) Foreign Application Priority Data

Jul. 30, 2019  (DE) .......................... 102019120511.5

(51) Int. Cl.
*B64C 13/30* (2006.01)
*B64C 13/38* (2006.01)
*B64C 3/56* (2006.01)

(52) U.S. Cl.
CPC ................ *B64C 13/30* (2013.01); *B64C 3/56* (2013.01); *B64C 13/38* (2013.01)

(58) Field of Classification Search
CPC ............ B64C 13/30; B64C 3/56; B64C 13/38
See application file for complete search history.

(56) References Cited

U.S. PATENT DOCUMENTS

| 2010/0019080 A1* | 1/2010 | Schweighart ............. B64C 3/56 244/49 |
| 2010/0051742 A1* | 3/2010 | Schweighart ............. B64C 3/56 244/49 |
| 2014/0117151 A1* | 5/2014 | Fox ........................ B64C 23/072 244/49 |
| 2018/0079485 A1 | 3/2018 | Kooiman et al. |
| 2019/0248468 A1* | 8/2019 | Lorenz ...................... B64C 3/56 |

FOREIGN PATENT DOCUMENTS

FR          861.600          2/1941

OTHER PUBLICATIONS

German Search Report for DE 102019120511.5, dated Mar. 31, 2020, 8 pages.

* cited by examiner

*Primary Examiner* — Justin M Benedik
(74) *Attorney, Agent, or Firm* — Nixon & Vanderhye P.C.

(57) ABSTRACT

A wing for an aircraft having a fixed wing, a foldable wing tip portion rotatably attached to the fixed wing and an actuation unit for rotating the foldable wing tip portion relative to the fixed wing about a hinge axis is disclosed. The actuation unit includes a traction means for transmitting traction between the fixed wing and the foldable wing tip portion, a main wheel attached to the foldable wing tip portion and in contact with the traction means and a drive means for generating traction to be transmitted by the traction means. The actuation unit generates traction with the drive means in the traction means so that the foldable wing tip portion can be rotated relative to the fixed wing.

18 Claims, 8 Drawing Sheets

WING FOR AN AIRCRAFT

CROSS REFERENCE TO RELATED APPLICATION

This application claims priority to and incorporates by reference German Application Number DE 10 2019 120 511.5, filed Jul. 30, 2019.

BACKGROUND

The present disclosure relates to a wing for an aircraft including a fixed wing and a foldable wing tip portion. The wing tip portion is mounted to the fixed wing in a rotatable or foldable manner such that it can be rotated about a hinge axis. Specifically, when the foldable wing tip portion is rotatable upwards, the hinge axis extends in a wing plane. Alternatively, when the foldable wing tip portion is rotatable rearwards or backwards, the hinge axis extends parallel to a wing plane. Further, the wing comprises an actuation unit for rotating the foldable wing tip portion relative to the fixed wing about the hinge axis, i.e. for movement between an extended position and a folded position.

Foldable wings, i.e., wings comprising a fixed wing and a foldable wing tip portion, are developed in order to reduce the space requirements of an aircraft during maneuver and parking on ground. As soon as the aircraft has landed the wing tip portions of the wing may be folded upwards or backwards, thereby reducing the overall span of the aircraft.

Different designs of the actuation unit have been proposed in the art. Generally, the actuation unit should be designed strong enough to reliably move the foldable wing tip portion between the extended and folded positions, but at the same time to have minimum weight and complexity in order to reduce costs of the related aircraft. Additionally, it would be advantageous from both an aerodynamic and a structural point of view if the outer contour or outer skin of the wing would not be penetrated.

SUMMARY

Accordingly, the disclosure provides a wing having a compact, strong and reliable actuation unit that requires little attention. A further object is to provide a corresponding actuation unit and an aircraft with a corresponding wing.

The disclosure encompasses wing having the features of claim 1, an actuation unit having the features of claim 14, and an aircraft having the features of claim 15. Exemplary embodiments of the wing are the subject-matter of the respective dependent claims.

In a first aspect the problem underlying the present invention is solved by a wing for an aircraft comprising a fixed wing, a foldable wing tip portion rotatably attached to the fixed wing and an actuation unit for rotating the foldable wing tip portion relative to the fixed wing about a hinge axis. The actuation unit comprises a traction means for transmitting traction between the fixed wing and the foldable wing tip portion, a main wheel attached to the foldable wing tip portion and in contact with the traction means and a drive means for generating traction to be transmitted by the traction means, wherein the actuation unit is configured such that by generating traction with the drive means in the traction means the foldable wing tip portion can be rotated relative to the fixed wing between an extended position and a folded position.

In other words, the wing according to the present invention comprises a fixed portion that may be directly attached to the fuselage of an aircraft. Mounted to the fixed wing is a foldable or rotatable wing tip portion, which can be moved relative to the main wing between at least an extended or in-flight position and a retracted or on-ground position. When the wing tip portion is in the retracted position, the span of the wing is reduced to facilitate ground handling such as taxiing and parking of an aircraft to which the wing has been affixed by reducing the required space.

The wing tip portion is rotatable about a hinge axis relative to the fixed wing. In principle, the hinge axis may extend either generally perpendicular to a wing plane in which the fixed wing extends or generally in the wing plane. A hinge axis extending generally perpendicular to the wing plane enables a rearwards/forward rotation or folding of the wing tip relative to the fixed wing, where the wing plane extends, for example, in a horizontal plane and/or in parallel to a chord line and/or in parallel to the upper or lower wing surface and/or in a flight direction of the aircraft. A hinge axis being arranged generally perpendicular to a wing plane may be tilted by at least 45°, or 60°, or by more than 75°, or more than 85° relative to the wing plane.

A hinge axis extending generally parallel to the wing plane enables an upward/downward rotation or folding of the wing tip relative to the fixed wing, where the wing plane extends, for example, in a horizontal plane and/or in parallel to a chord line and/or in parallel to the upper or lower wing surface and/or in a flight direction of the aircraft. A hinge axis being arranged generally parallel to a wing plane may be tilted by no more than 45°, or by no more than 30°, or by no more than 15°, or by no more than 5° relative to the wing plane.

An actuation unit is provided for moving the wing tip portion between the extended and the retracted position about the hinge axis and comprises a traction means, a main wheel and a drive means.

The traction means can be any means which transfers traction between the fixed wing and the wing tip portion. In the following traction may also be referred to as a traction force or tension or a drag force. In other words, the traction means is used to move the wing tip portion by dragging or pulling a far end of the wing tip portion towards or away from the fixed wing portion. In this embodiment of the wing and all of the further exemplary embodiments the traction means is at least partly formed as a belt, a chain or a cable.

The main wheel may be attached to the wing tip portion. Depending on the specific embodiment of the actuation unit, the attachment to the wing tip may be fixed or rotatable. If the main wheel is attached fixedly to the wing tip, it cannot be rotated relative to the wing tip portion. On the other hand, a rotatable attachment refers to a main wheel that can be rotated relative to the wing tip portion.

The main wheel is in contact with the traction means so that the traction transferred by the traction means is either translated by the main wheel into a rotational movement of the main wheel or a rotational movement of the main wheel creates traction in the traction means. To this end, a contact surface of the traction means is adapted to the kind of traction means which is contact with the contact surface. For example, if the traction means in contact with the main wheel is a chain, the main wheel is formed as a sprocket. The connection between the main wheel and the traction means is formed such that the main wheel does not slip relative to the traction means. To this end it may, for example, be possible to provide a cable cleat if the traction means is a cable.

Further, the drive means is provided for generating traction in the traction means. The drive means may, for example, be powered electrically and/or hydraulically and/or pneumatically. For example, the drive means may be formed by an electric motor driving a drive wheel which is in contact with the traction means. Alternatively, the drive means may be a linear motor pulling on one end of the traction means.

The wing according to the present invention advantageously requires little space, in particular, in the area of the joint between the fixed wing and the wing tip portion as only the traction means, be it a cable, a chain or a belt, needs to extend between the fixed wing and wing tip portion. Further, since the traction means can be guided using guide means such as pulleys or sprockets, the actuation unit can be routed through narrow spaces and installed under tight space requirements. Also, it can be used for folding the wing tip portion up and down or backwards and forwards. Finally, the wing and, in particular, the actuation unit provides a robust solution as no sensitive parts are exposed to the environment.

An axis of rotation of the main wheel may correspond to the hinge axis. The main wheel may be fixed to the foldable wing tip portion such that a rotation of the main wheel relative to the fixed wing corresponds to a rotation of the foldable wing tip portion relative to the fixed wing. The drive means may be attached to the fixed wing. In the exemplary embodiment, the wing tip portion rotates with the main wheel relative to the fixed wing. Thus, a reduction gear can be realized with the actuation unit by using, for example, a drive wheel with a smaller diameter than the main wheel such that a full revolution of the drive wheel results only in a part of a full revolution of the main wheel.

In an exemplary embodiment the actuation unit comprises an input section where traction is generated by the drive means and an output section where the main wheel is in contact with the traction means. In the input section the traction means extends in an input plane and in the output section the traction means extends in an output plane, wherein the output plane is tilted relative to the input plane. The main wheel extends in the output plane so that the hinge axis extends perpendicular to the output plane.

The exemplary embodiment is particularly useful to realize a backward folding wing tip portion where the hinge axis does not extend exactly perpendicular to the wing plane but is tilted to enable the rotational movement of the folding wing tip. Since the wing thickness is limited, only a very compact actuation unit could be realized if all elements of the actuation unit were to be arranged within the wing contour. The more the hinge axis is tilted out of the perpendicular axis, the less space is available within the wing contour. However, by tilting the input plane relative to the output plane, the space available for the actuation unit can be increased as only the input section needs to fit in the space available in the tilted output plane.

In the exemplary embodiment the traction means may, for example, be in form of a cable enabling a transmission of traction between the input section and the output section. Using a cable advantageously allows a change in the load direction within the traction means without risking damage of the latter.

The actuation unit may comprise a drive wheel rotatable about a drive axis and configured to be rotated by the drive means for generating traction in the traction means, wherein the drive axis extends perpendicular to the input plane. Thus, the input plane could also be defined as the plane extending perpendicular to the drive axis about which the drive wheel rotates.

The traction means may form a closed loop and the main wheel is enclosed by the traction means. In other words, the closed loop of the traction means encloses an area and the main wheel is arranged in this area.

The actuation unit may comprise two contact guide elements which are provided for guiding the traction means such that the traction means remains in contact with the main wheel when the foldable wing tip portion is rotated relative to the fixed wing. The contact guide elements advantageously ensure a thorough contact between the traction means and the main wheel to ensure that the traction means does not slip relative to the main wheel. Further, the contact guide elements enable the tilt between the input plane and the output plane. The part of the traction means extending between the two contact guide elements and extending past the main wheel may form the output plane.

In an exemplary embodiment, the actuation unit may additionally comprise two input guide elements and the input plane may be formed by that part of the traction means extending between the input guide elements and past a drive wheel. Using additional input guide elements thus allows a softer transition between an input plane and an output plane as the tilt can be realized via an intermediate plane defined by the input guide elements and the contact guide elements. Both the input guide elements and the contact guide elements may, for example, be formed as pulleys or rollers.

In another exemplary embodiment the actuation unit comprises an input section where traction is generated by the drive means and an output section where the main wheel is in contact with the traction means, wherein the input section and the output section extend in the same plane. Such an embodiment is particularly advantageous where the folding wing tip portion is rotated upwards. Here, sufficient space is available in the plane in which the input section and the output section extend such that it is not necessary to tilt the input and output planes relative to one another. Further, arranging the input and output section in the same plane advantageously allows the use of a chain as traction means.

The main wheel may comprise a contact surface configured for being at least partially in contact with the traction means while the foldable wing tip is rotated between the extended position and the folded position, wherein the contact surface extends along a section of an arc of a circle over an extension angle, the extension angle being 270° or less than 180° or less. In other words, the main wheel does not necessarily have a circular circumference in the output plane but has, for example, only the shape of a half circle in the output plane where the contact surface extends over 180° or three quarters of a circle where the extension angle is 270°. Using only a partial main wheel has the advantage that it requires less space to house the main wheel inside the wing's contour. For example, a wheel with a radius corresponding to about the thickness of the wing can be arranged nearly entirely inside the contour of the wing tip portion when the hinge axis extends perpendicular to the fixed wing thickness direction and the extension angle is 180° or less. A main wheel with a contact surface covering an extension angle of 360°, i.e., a main wheel having a cross section corresponding to a full circle, can in the same arrangement only be housed within the contour of the wing tip portion if the diameter of the main wheel does not exceed the thickness of the wing tip portion. Thus, by providing a main wheel having a contact surface covering only a limited extension angle allows to arrange the main wheel entirely inside the wing tip portion contour while maximizing the radius of the wheel which in turn improves the reduction rate of a reduction gear formed by the actuation unit.

The traction means may form a closed loop and that the main wheel is not enclosed by the traction means. In other words, the closed loop of the traction means encloses an area and the main wheel is not arranged in this area. This again enables a compact design of the actuation unit as the traction means does not have to be guided in a way such that the main wheel can rotate in the area enclosed by the traction means which is required to realize the benefits of a main wheel not having the shape of a full circle.

The folding wing tip portion is rotated by a folding angle about the hinge axis between the extended and the folded position, wherein at any time only a currently active section of the contact surface of the main wheel is in contact with the traction means, wherein the currently active section of the contact surface extends over no more than the difference between the extension angle and the folding angle. In this way the contact area available for transferring loads between the main wheel and the traction means can be maximized while at the same time minimizing the extension angle of the contact surface. This allows for a particularly compact actuation unit.

The actuation unit may comprise two contact guide elements which are provided for guiding the traction means such that the traction means remains in contact with main wheel when the foldable wing tip portions is rotated relative to the fixed wing, wherein the two contact guide elements are attached to the fixed wing. The contact guide elements advantageously ensure that the traction means is in tight contact with the main wheel.

In a further exemplary embodiment, the drive means is configured for rotating the main wheel such that the main wheel generates traction in the traction means, wherein the traction means extends from a first position at the fixed wing via the main wheel to a second position at the fixed wing, wherein the traction is means is fixed at the first position and the second position to the fixed wing, wherein a first length of the traction means between the first position and the main wheel and a second length of the traction means between the second position and the main wheel can be modified by rotating the main wheel and wherein by modifying the first length and the second length the foldable wing tip portion is rotated relative to the main wing portion.

In the further exemplary embodiment, the drive unit is arranged in the wing tip portion and drives the main wheel. The main wheel essentially pulls the wing tip portion between the retracted and the extended position using the traction means.

In another aspect the problem underlying the present invention is solved by an actuation unit for rotating a foldable wing tip portion relative to a fixed wing about a hinge axis, wherein the actuation unit comprises a traction means for transmitting traction between the fixed wing and the foldable wing tip portion, a main wheel may be attached to the foldable wing tip portion and in contact with the traction means and a drive means for generating traction to be transmitted by the traction means, wherein the actuation unit is configured such that by generating traction with the drive means in the traction means the foldable wing tip portion can be rotated relative to the fixed wing between an extended position and a folded position.

The actuation unit may be implemented in the same way as the actuation unit that has above been described as part of the different embodiments of a wing. The advantages of the different embodiments of the actuation unit therefore correspond to the advantages of the previously described embodiments of the wing.

According to a third aspect the problem underlying the present invention is solved by an aircraft comprising a wing according to any of preceding embodiments or an actuation unit according to any of the preceding embodiments.

The advantages of the different embodiments of the aircraft correspond to the advantages of the embodiment of the wing and/or the actuation unit employed therein.

BRIEF DESCRIPTION OF THE DRAWINGS

In the following the present invention will be described in more details with reference to exemplary embodiments of a wing, an actuation unit and an aircraft shown in the drawings, wherein.

In the following description of exemplary embodiments of an aircraft, a wing and an actuation unit, unless otherwise indicated, like reference numerals will be used throughout the Figures to indicate like elements.

DETAILED DESCRIPTION OF SOME EMBODIMENTS

Some embodiments will now be described with reference to the Figures.

Figure 1:
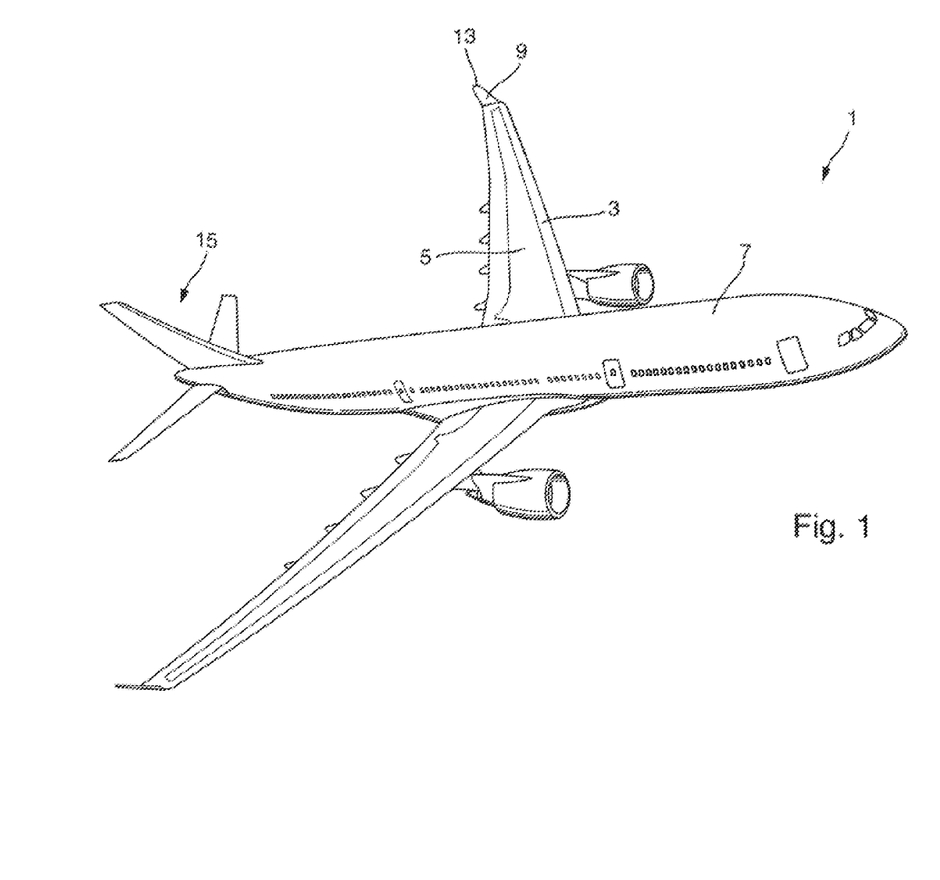
FIG. 1 shows an exemplary embodiment of an aircraft comprising an exemplary embodiment of a wing with a folding wing tip portion.

FIG. 1 shows an exemplary embodiment of an aircraft 1 comprising a wing 3 with a fixed portion 5 attached to a fuselage 7 and a foldable wing tip portion 9. The foldable wing tip portion 9 can be rotated or folded relative to the fixed wing 5 between a retracted position and an extended position using an actuation unit. In FIG. 1 the actuation unit is not shown as it is arranged inside the wing contour.

Figure 2:
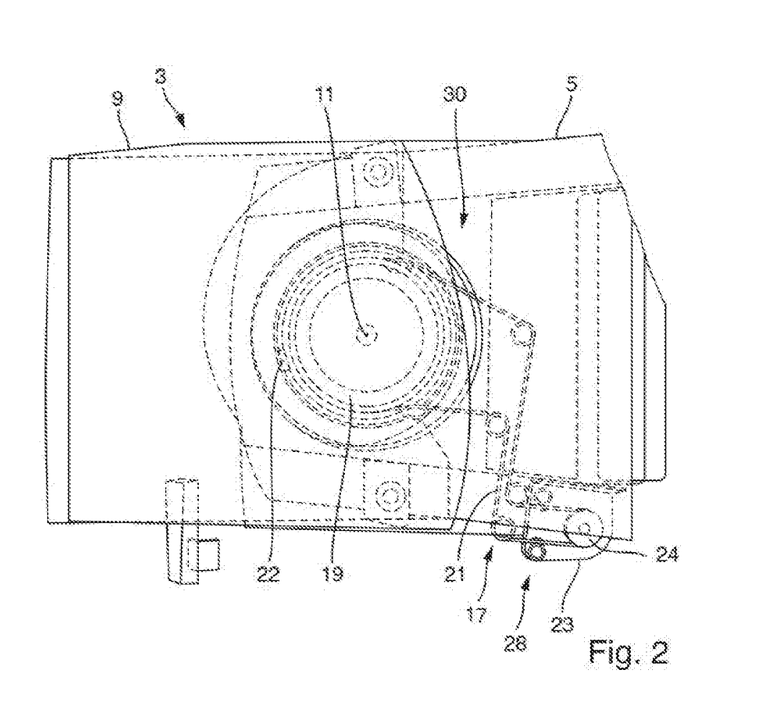
FIG. 2 shows a section of a top view of an exemplary embodiment of a wing comprising an exemplary embodiment of an actuation unit
Figure 3:
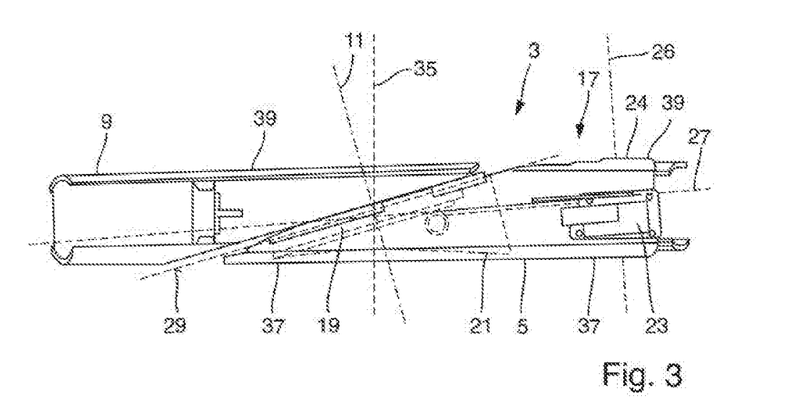
FIG. 3 shows a side view of the wing of FIG. 2.
Figure 4:
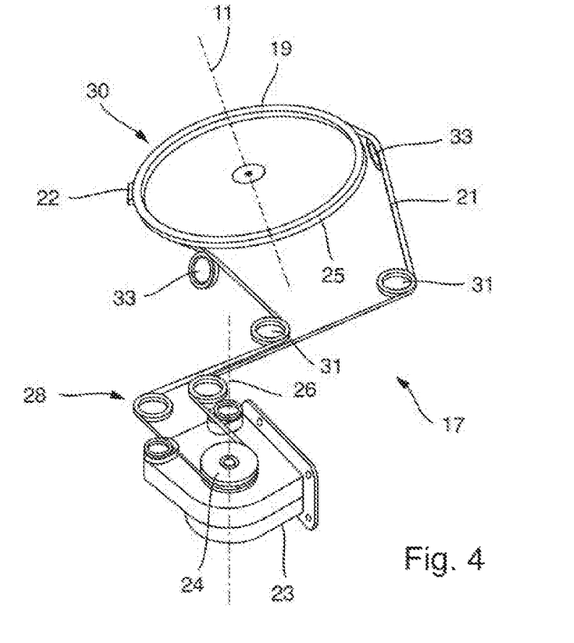
FIG. 4 shows the exemplary embodiment of an actuation unit of FIGS. 2 and 3.
Figure 5:
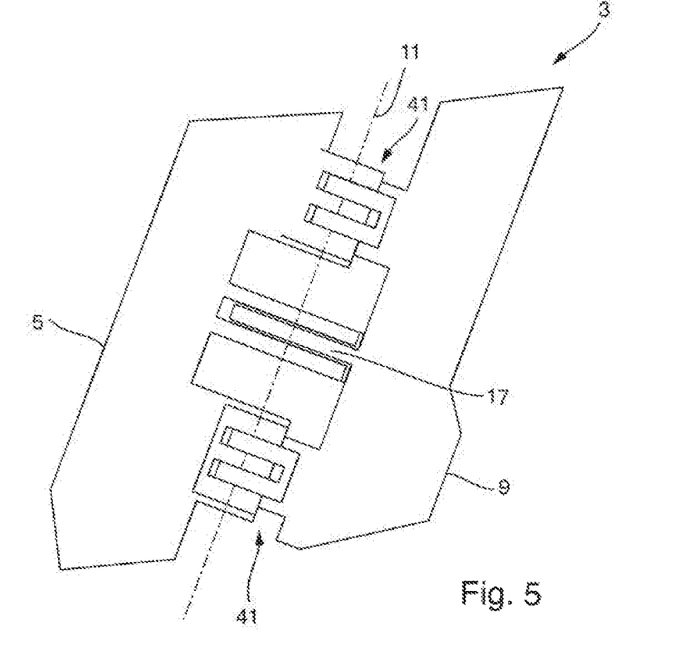
FIG. 5 shows a section of a top view of an exemplary embodiment of a wing comprising an exemplary embodiment of an actuation unit.

With reference to FIGS. 2 to 4, a first detailed exemplary embodiment of a wing 3 is illustrated comprising a fixed wing 5 and a foldable wing tip portion 9 will now be described in more detail. The foldable wing tip portion 9 is a backwards folding wing tip portion 9, i.e., it rotates about a hinge axis 11 which is only slightly tilted relative to the wing's 3 thickness direction or extends generally perpendicular relative to a wing plane of the wing 3 between an in-flight position and an on-ground position. Since the tip 13 of the wing tip portion 9 (see FIG. 1) rotates backwards towards a tail 15 of the aircraft 1, the foldable wing tip portion 9 is also referred to as a backwards folding wing tip portion 9.

The wing 3 comprises an actuation unit 17 with a main wheel 19, a traction means 21 and a drive means 23. In FIG. 4 only an outer circumference of the main wheel 19 is shown. The main wheel 19 is mounted fixedly to the wing tip portion 9 such that the wing tip portion 9 rotates with the main wheel 19 about the hinge axis 11. In order to rotate the main wheel 19 and with the main wheel 19 the wing tip portion 9 the traction means 21 in form of a cable is provided. The traction means 19 is in contact with a contact surface 25 of the main wheel 19 in order to transmit traction generated by the drive means 23 and rotate the wing tip portion 9 backwards and forwards. Additionally, a cable cleat 22 is provided for fixing the traction means 21 to the main wheel 19 so that the traction means 21 cannot slip relative to the main wheel 19.

The drive means 23 comprises a drive wheel 24 rotating about a drive axis 26 for generating traction in the traction means 21. In order to improve a load transfer between the drive wheel 24 and the traction means 21, the traction means 21 can be wound multiple times around the drive wheel 24.

The actuation unit 17 comprises an input section 28 and an output section 30. The input section 28 of the actuation unit 17 is formed by a part of the traction means 21 extending along an input plane 27 which extends perpendicular to the drive axis 26, i.e., in the same plane as the drive wheel 24. In other words, the term input section 28 is used to designate the track of the traction means 21 extending between two input guide elements 31 or input pulleys 31 and past the drive wheel 24. The input plane 27 is only shown in FIG. 3.

Another part of the traction means 21 which extends along an output plane 29 is designated as the output section 30. It is delimited by two contact guide elements 33 or output pulleys 33, which are provided for guiding the traction means 21 towards the contact surface 25 of the main wheel 19. Further, since the output plane 29 extends perpendicular to the hinge axis 11 and parallel to main wheel 19, it is tilted relative to the input plane 27. The tilt between the input plane 27 and the output 29 is advantageously facilitated by means of the traction means 21 in form of a cable which transfers the traction between the two planes 27, 29. As can be seen best in FIG. 4, the traction means 21 forms a closed loop and enclosed the main wheel 19.

As can be seen best in FIG. 3, since the hinge axis 11 is tilted relative to the wing thickness direction 35, only very limited space is available inside the wing contour for installing an actuation means where the entire traction means extends in the same plane, i.e., where the input plane and the output plane are identical. By using a cable as traction means 21 the input plane and the output plane can be tilted relative to each other. Thereby, additional space is provided where the remainder of the actuation unit 17 can be arranged while keeping all elements of the actuation unit 17 between the lower and upper wing surface 37, 39 which define the contour of the wing 3. Further, as can be seen best in FIG. 3, all elements of the actuation unit are arranged inside the wing 3 so that the actuation unit is not subject to the environment.

A second detailed exemplary embodiment of a wing 3 with a fixed wing 5 and a foldable wing tip portion 9 will in the following be described with reference to FIGS. 5 to 8b. The wing tip portion 9 is up-folding, i.e., in the retracted or on-ground position the tip 13 of the wing tip portion 9 is folded upwards and towards the fuselage 9. As can be seen best in FIG. 5, the wing tip portion 9 is connected to the fixed wing 5 via two hinge elements 41 which allow rotation between the fixed wing 5 and the wing tip portion 9 about a hinge axis 11. An actuation unit 17 has been arranged between the two hinge elements 41.

Figure 6:
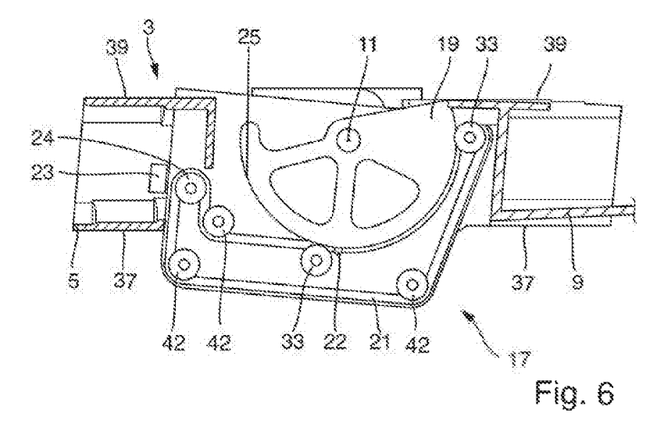
FIG. 6 shows a sectional view of the wing of FIG. 5.

The layout of the actuation unit 17 can be seen best in FIG. 6 where a cross section through the actuation unit 17 as part of the wing 3 is shown. The actuation unit 17 also comprises a main wheel 19, a traction means 21 and a drive means 23. The main wheel 19 is part of the structure of the wing tip portion 9 and has a contact surface 25 for transmitting traction between the traction means 21 and the main wheel 19. Further, a cable cleat 22 is provided for fixing the traction means 21 to the main wheel 19 to prevent slippage or slip between the main wheel 19 and the traction means 21. In the present embodiment the traction means 21 is formed as a cable. However, it could also be formed partially or fully as a chain or a belt. Evidently, the main wheel 19 and any further wheels or guide elements would have to be adapted to a different traction means 21, for example, by replacing them with sprockets.

The main wheel 19 is not a full wheel as in the preceding embodiment but has a cross section that loosely corresponds to a half circle. In other words, the contact surface 25 does not cover a full arc or 360° but only extends about an extension angle of 180°. Hence, the main wheel 19 can be considerably larger as compared to a full wheel and still fit entirely within the contour of the wing 3 which allows for an increased reduction rate of the reduction gear formed by the actuation unit 17.

Figure 7A:
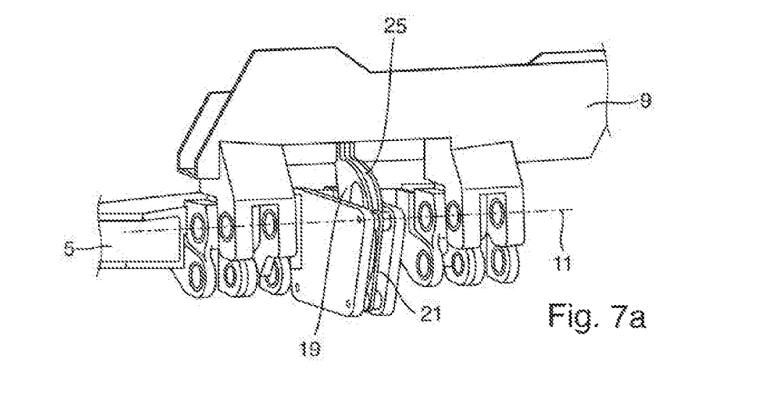
FIG. 7a shows an elevated view of the exemplary embodiment of a wing of FIG. 5 with a wing tip portion in a retracted position.
Figure 7B:
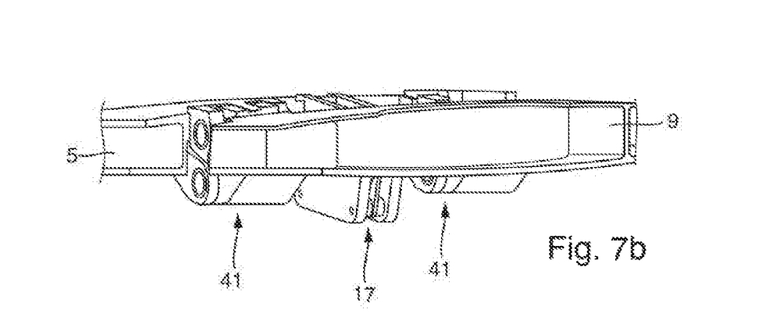
FIG. 7b shows an elevated view of the exemplary embodiment of a wing of FIG. 5 with the wing tip portion in an extended position.

As can be seen by the comparison of FIGS. 6, 7a and 7b as well as 8a and 8b, at any time only a currently active region of the contact surface 25 is in contact with the traction means 21. The currently active region of the contact surface 25 extends over no more than the difference between the extension angle of the contact surface 25 of the main wheel minus the folding angle by which the folding wing tip portion 9 is folded upwards from the extended to the retracted position. In the exemplary embodiment of FIGS. 5 to 8b the folding angle is 90°.

The actuation unit 17 further comprises a drive wheel 24 which is connected to the drive means 23. The drive means 23 is formed by an electric motor but could also be formed by a hydraulic motor. Also, it is possible to use a linear drive to pull the traction means 21 instead of using a motor with a rotating drive shaft. The drive wheel 24 has a smaller radius or diameter than the main wheel 19. The actuation means 21 therefore forms a reduction gear in which many revolutions of the drive wheel 24 are translated into a single quarter revolution of the main wheel 19. This advantageously allows the use of drive means 23 that consume less power and require less torque as compared to drive means that directly actuate the wing tip portion 9. Hence, more compact drive means 23 can be employed.

In addition to the drive wheel 24 and the main wheel 19, the actuation unit 17 also comprises two contact guide elements 33 which guide the traction means 21 such that is brought reliably into contact with the contact surface 25 of the main wheel 19 and a plurality of further guide elements 42 guiding the traction means 21 between contact guide elements 33 past the drive wheel 24. In the exemplary embodiment of FIGS. 5 to 8b, the contact guide elements 33 are formed by pulleys which are mounted rotatably to the fixed wing 5. Hence, all movable parts of the actuation unit 19 are attached to the fixed wing 5.

Figure 8A:
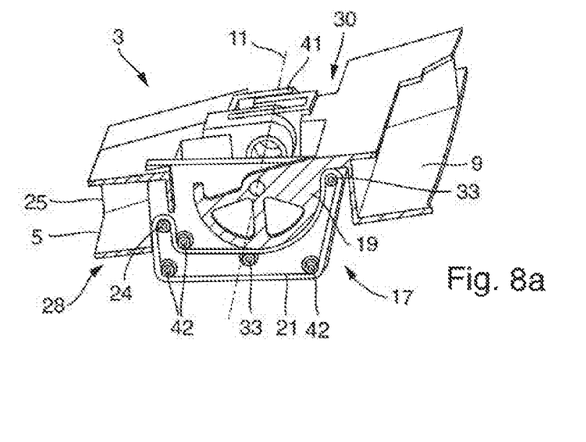
FIG. 8a shows a sectional view of the exemplary embodiment of a wing of FIG. 5 with a wing tip portion in an extended position.
Figure 8B:
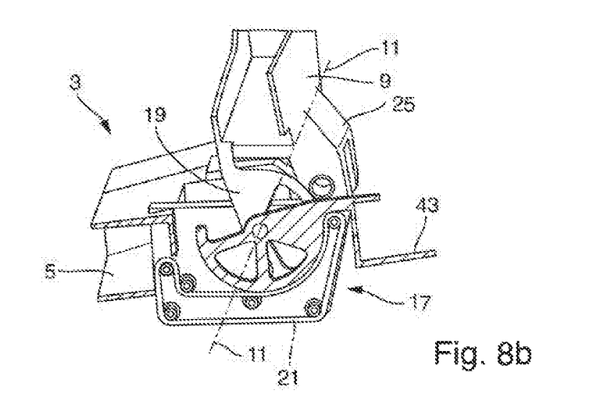
FIG. 8b shows an elevated view of the exemplary embodiment of a wing of FIG. 5 with the wing tip portion in a retracted position; and, FIG. 9 shows a top view of an exemplary embodiment of a wing with an exemplary embodiment of an actuation unit.

The comparison of FIGS. 7a, 7b, 8a and 8b show the movement of the wing tip portion 9 relative to the fixed wing 5 between the extended position in FIGS. 7b and 8a and the retracted position in FIGS. 7a and 8b. In FIG. 8b the orientation of the wing tip portion 9 in the extended position is designated for comparison with reference numeral 43. Further, in FIGS. 7a, 7b, 8a and 8b various reference numerals have been omitted to keep the Figures intelligible. As can be taken from these Figures and also from FIG. 6, the entire drive means 21 is arranged in the same plane, i.e., the input section 28 and output section 30 of the actuation unit 17 are not arranged in respective input and output planes that are tilted relative to one another.

Figure 9:
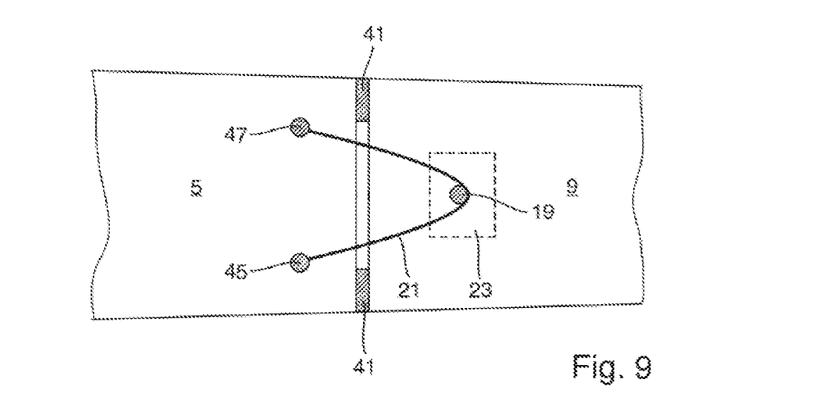

Finally, FIG. 9 shows a third exemplary embodiment of a wing 3. Here, the drive means 23 is configured for rotating the main wheel 19 relative to the foldable wing tip portion 9 in a way that the main wheel 19 generates traction in the traction means 21. The traction means 21 extends from a first position 45 at the fixed wing 5 via the main wheel 19 to a second position 47 at the fixed wing 5. The traction means 21 is fixed at the first position 45 and the second position 47 to the fixed wing 5, wherein a first length of the traction means 21 between the first position 45 and the main wheel 19 and a second length of the traction means 21 between the second position 47 and the main wheel 19 can be modified by rotating the main wheel 19. This results in rotating the foldable wing tip portion 9 relative to the main wing portion 3.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a fixed wing,
a foldable wing tip portion rotatably attached to the fixed wing,
an actuation unit for rotating the foldable wing tip portion relative to the fixed wing about a hinge axis,
wherein the actuation unit comprises a traction means for transmitting traction between the fixed wing and the foldable wing tip portion, a main wheel in contact with the traction means and a drive means for generating traction to be transmitted by the traction means, and
wherein the actuation unit is configured such that by generating traction with the drive means in the traction means the foldable wing tip portion can be rotated relative to the fixed wing between an extended position and a folded position.

2. The wing according to claim 1, wherein an axis of rotation of the main wheel corresponds to the hinge axis, wherein the main wheel is fixed to the foldable wing tip portion such that a rotation of the main wheel relative to the fixed wing corresponds to a rotation of the foldable wing tip portion relative to the fixed wing and wherein the drive means is attached to the fixed wing.

3. The wing according to claim 1, wherein the actuation unit comprises an input section where traction is generated by the drive means and an output section where the main wheel is in contact with the traction means, wherein in the input section the traction means extends in an input plane and in the output section the traction means extends in an output plane, wherein the output plane is tilted relative to the input plane.

4. The wing according to claim 3, wherein the traction means is a least partially formed as a cable for enabling a transmission of traction between the input section and the output section.

5. The wing according to claim 3, wherein the actuation unit comprises a drive wheel rotatable about a drive axis and configured to be rotated by the drive means for generating traction in the traction means, wherein the drive axis extends perpendicular to the input plane.

6. The wing according to claim 3, wherein the traction means forms a closed loop and wherein the main wheel is enclosed by the traction means.

7. The wing according to claim 1, wherein the actuation unit comprises an input section where traction is generated by the drive means and an output section where the main wheel is in contact with the traction means, wherein the input section and the output section extend in the same plane.

8. The wing according to claim 7, wherein the main wheel comprises a contact surface configured for being at least partially in contact with the traction means while the foldable wing tip is rotated between the extended position and the folded position, wherein the contact surface extends along a section of an arc of a circle over an extension angle, the extension angle being 270° or less.

9. The wing according to claim 8, wherein the traction means forms a closed loop and wherein the main wheel is not enclosed by the traction means.

10. The wing according to claim 8, wherein the folding wing tip portion is rotated by a folding angle about the hinge axis between the extended and the folded position and wherein at any time only a currently active section of the contact surface of the main wheel is in contact with the traction means, wherein the active section of the contact surface extends over no more than the difference between the extension angle and the folding angle.

11. The wing according to claim 7, wherein the main wheel comprises a contact surface configured for being at least partially in contact with the traction means while the foldable wing tip is rotated between the extended position and the folded position, wherein the contact surface extends along a section of an arc of a circle over an extension angle, the extension angle being 180° or less.

12. The wing according to claim 1, wherein the actuation unit comprises two contact guide elements which are provided for guiding the traction means such that the traction means remains in contact with main wheel when the foldable wing tip portion is rotated relative to the fixed wing, wherein the main wheel is fixed to the foldable wing tip portion and wherein the two contact guide elements are attached to the fixed wing.

13. The wing according to claim 1, wherein the drive means is configured for rotating the main wheel such that the main wheel generates traction in the traction means, wherein the traction means extends from a first position at the fixed wing via the main wheel to a second position at the fixed wing, wherein the traction means is fixed at the first position and the second position to the fixed wing, wherein a first length of the traction means between the first position and the main wheel and a second length of the traction means between the second position and the main wheel can be modified by rotating the main wheel and wherein by modifying the first length and the second length the foldable wing tip portion is rotated relative to the main wing portion.

14. The wing according to claim 1, wherein the traction means is at least partly formed as a belt, a chain or a cable.

15. An aircraft comprising the wing according to claim 1.

16. An actuation unit for rotating a foldable wing tip portion relative to a fixed wing about a hinge axis, wherein the actuation unit comprises a traction means for transmitting traction between the fixed wing and the foldable wing tip portion, a main wheel in contact with the traction means and a drive means for generating traction to be transmitted by the traction means, wherein the actuation unit is configured such that by generating traction with the drive means in the traction means the foldable wing tip portion can be rotated relative to the fixed wing between an extended position and a folded position.

17. An aircraft comprising the actuation unit according to claim 16.

18. A wing for an aircraft, comprising:
- a fixed wing,
- a foldable wing tip portion rotatably attached to the fixed wing,
- an actuation unit for rotating the foldable wing tip portion relative to the fixed wing about a hinge axis,
- wherein the actuation unit comprises a cable for transmitting traction between the fixed wing and the foldable wing tip portion, a main wheel in contact with the cable and a motor for generating traction to be transmitted by the cable, and
- wherein the actuation unit is configured to rotate the foldable wing tip portion relative to the fixed wing portion between an extended position and a folded position by the traction generated with the motor in the cable.

* * * * *